(12) United States Patent
Krishnamurthy et al.

(10) Patent No.: US 11,409,350 B1
(45) Date of Patent: Aug. 9, 2022

(54) AUTOMATIC SLEEP CIRCUIT

(71) Applicant: Texas Instruments Incorporated, Dallas, TX (US)

(72) Inventors: Ganapathi Shankar Krishnamurthy, Bangalore (IN); Venkatesh Guduri, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/390,276

(22) Filed: Jul. 30, 2021

(51) Int. Cl.
G06F 1/32 (2019.01)
G06F 9/44 (2018.01)
G06F 1/3206 (2019.01)
G06F 9/4401 (2018.01)
G06F 1/3287 (2019.01)

(52) U.S. Cl.
CPC .......... *G06F 1/3206* (2013.01); *G06F 1/3287* (2013.01); *G06F 9/4418* (2013.01)

(58) Field of Classification Search
CPC ..... G06F 1/3206; G06F 1/3287; G06F 9/4418
See application file for complete search history.

(56) References Cited

U.S. PATENT DOCUMENTS

2008/0007234 A1\* 1/2008 Agari .................... H02M 3/158
 323/282
2008/0239593 A1\* 10/2008 Lavier ................... G01R 31/40
 361/18
2015/0378385 A1\* 12/2015 Rana ..................... H03K 3/3562
 327/143

OTHER PUBLICATIONS

DRV8210 11-V H-Bridge Motor Driver with BWM, PH/EN, and Half-Bridge Control Interfaces and Low-Power Sleep Mode, Datasheet DRV8210 (Texas Instruments Incorporated, Apr. 2021).
DRV8212 11-V H-Bridge Motor Driver with BWM, PH/EN, and Half-Bridge Control Interfaces and Low-Power Sleep Mode, Datasheet DRV8212 (Texas Instruments Incorporated, Jun. 2021).

\* cited by examiner

*Primary Examiner* — Stefan Stoynov
(74) *Attorney, Agent, or Firm* — Mark A. Valetti; Charles A. Brill; Frank D. Cimino

(57) ABSTRACT

An integrated circuit including an autosleep circuit and a voltage regulator. The autosleep circuit includes a latch, a voltage detection circuit outputting a signal to a set input of the latch responsive to a voltage at its input exceeding a threshold voltage, and a delay timer outputting a signal to a reset input of the latch responsive to inactivity at one or more input terminals. A voltage regulator is configured to generate a voltage for biasing a subsystem such as digital logic, and is also the input voltage to the voltage detection circuit. The voltage regulator includes a plurality of transistors in parallel, one gated by the output of the latch and each of the others gated by one of the one or more input terminals. The voltage regulator includes an output leg that generates the output voltage responsive to one of the parallel transistors being turned on.

19 Claims, 3 Drawing Sheets

AUTOMATIC SLEEP CIRCUIT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This relates to electronic circuits, and is more specifically directed to integrated circuits having a sleep or powered-down operating mode or state.

Power consumption in electronic circuits has long been a major design concern. The power dissipated by an integrated circuit, in particular, presents thermal conduction issues, affects device reliability, and often constrains the operating performance of the integrated circuit, forcing a design tradeoff of speed versus power consumption. System implementations must, of course, consider the power consumed by integrated circuits in the system in designing the power sources and distribution in the system, and also in designing the package form factor and thermal design of the system. The growing popularity and demand for battery-powered electronic systems and devices has further heightened design attention to power consumption in these systems.

A common technique in many integrated circuits is to provide a sleep function that powers down at least a portion of the integrated circuit to save power during these "sleep" periods. Some devices have a dedicated "sleep" terminal to receive an external control signal, in response to which the device powers down at least a portion of its circuitry to reduce power consumption. Other devices include an "auto-sleep" function that monitors a period over which the device has been inactive, and in response to inactivity for a given duration, powers down at least a portion of the device to reduce power consumption in the idle state.

Some integrated circuit devices have two or more power supply terminals for receiving separate power supply voltages for various portions of the device. For integrated circuits of this type, the separate power supply pins enable powering down a portion of the device that may be idle, without powering down the entire device. Examples of these devices are motor driver circuits such as the DRV82xx motor driver family of integrated circuits available from Texas Instruments Incorporated, which have one power supply pin for receiving a motor voltage for biasing the output driver, and a separate power supply pin for digital logic circuitry in the device. In these devices, the logic circuitry can be powered down simply by applying a standby voltage or grounding the dedicated logic power supply pin.

However, in some configurations of motor driver or other integrated circuits, a separate power supply pin for digital logic may not be available due to form factor considerations. In conventional devices in which a separate external power supply pin for the digital logic is not provided, the digital power supply voltage is generated on-chip by an internal voltage regulator circuit. Since the voltage regulator generating the digital power supply voltage remains on in these devices in the sleep mode, significant current can be consumed by these devices even with the digital logic powered down.

It is within this context that the embodiments described herein arise.

BRIEF SUMMARY OF THE INVENTION

According to one aspect, an integrated circuit with at least one input terminal and a power supply terminal includes autosleep logic circuitry and a voltage regulator is provided. The autosleep logic circuitry includes a latch, a voltage detection circuit with an input coupled to an output node of the voltage regulator and configured to present a signal to a set input of the latch responsive to a voltage at its input exceeding a threshold level, and a delay timer with inputs coupled to the input terminals and configured to present a signal to a reset input of the latch responsive to detecting inactivity at the at least one input terminal for a delay time. The voltage regulator circuit includes a plurality of parallel transistors, each having a conductive path coupled in parallel with the conductive path of the others of the parallel transistors between a power supply node coupled to the power supply terminal and a ground node, a first one of the parallel transistors having a control terminal coupled to the output of the latch, and each of the other parallel transistors having a control terminal coupled to a corresponding one of the at least one input terminals, and an output leg configured to present a voltage at its output node responsive to at least one of the parallel transistors conducting current between the power supply node and the ground node, the output node coupled to the input of the voltage detection circuit. The latch turns on the first parallel transistor when in its set state.

According to another aspect, a method of powering a subsystem in an integrated circuit is provided. The method includes detecting whether an active signal is received at one or more input terminals of the integrated circuit, and if so, turning on a voltage regulator to develop a power supply voltage at an output node for powering a subsystem of the integrated circuit. A voltage regulator is turned on to develop a power supply voltage at an output node for powering a subsystem of the integrated circuit responsive to the power supply voltage exceeding a threshold level. Responsive to the power supply voltage then exceeding a threshold level, setting a latch in an autosleep circuit in the integrated circuit to maintain the voltage regulator in an on state. Responsive to detecting that an active signal has not been received at the one or more input terminals for at least a delay time, the method includes resetting the latch in the autosleep circuit to turn off the voltage regulator. The method repeats from the detecting step.

Technical advantages enabled by one or more of these aspects include attaining an extremely low level of standby current conducted by an internal voltage regulator in a sleep mode, as the voltage regulator itself turns off by the condition that triggered the autosleep logic. Furthermore, the autosleep and voltage regulator circuitry can be efficiently implemented with little additional die area, and in integrated circuits with low pin count.

Other technical advantages enabled by the disclosed aspects will be apparent to those of ordinary skill in the art having reference to the following specification together with its drawings.

BRIEF DESCRIPTION OF THE SEVERAL VIEWS OF THE DRAWING

The same reference numbers or other reference designators are used in the drawings to illustrate the same or similar (in function and/or structure) features.

DETAILED DESCRIPTION OF THE INVENTION

The one or more embodiments described in this specification are implemented into an integrated circuit with an internal voltage regulator circuit and an autosleep function, as it is contemplated that such implementation is particularly advantageous in that context. However, it is also contemplated that aspects of these embodiments may be beneficially applied in other applications in which an autosleep function is incorporated. Accordingly, it is to be understood that the following description is provided by way of example only and is not intended to limit the true scope of this invention as claimed.

Figure 1:
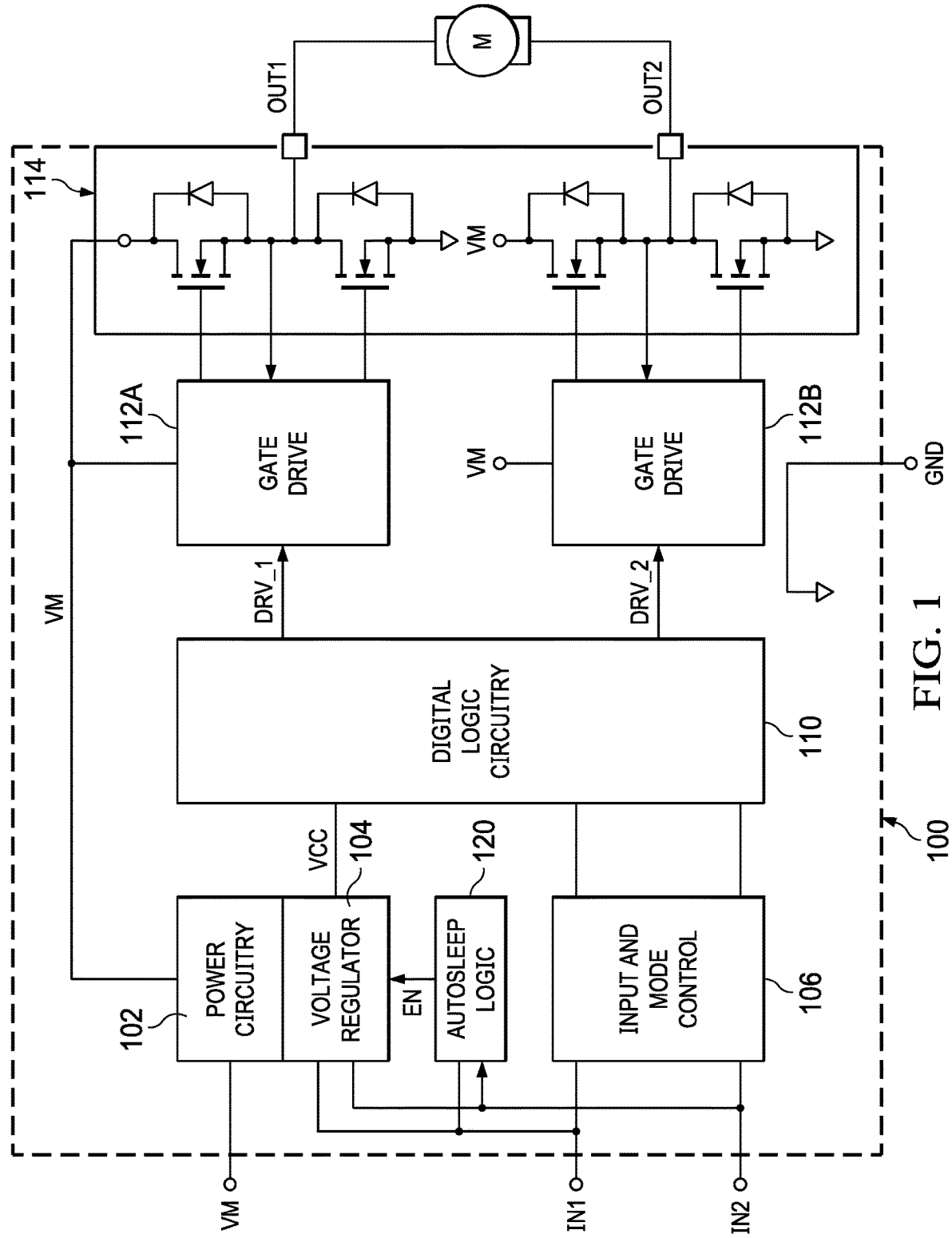
FIG. 1 is an electrical diagram, in block form, of an integrated circuit in which example embodiments may be implemented.

FIG. 1 illustrates the architecture of integrated circuit 100 in which one or more embodiments may be implemented. In this example, integrated circuit 100 is constructed to operate as a motor driver and, as such, has two output terminals OUT1, OUT2 at which a motor M may be coupled. Integrated circuit 100 has input terminals IN1, IN2, a terminal VM for receiving a power supply voltage (e.g., motor voltage VM as will be referred to in this description), and a ground terminal GND. While additional terminals may be provided at integrated circuit 100, it is contemplated that the six terminals shown in FIG. 1 can be sufficient for providing a motor driver in the form of a small form factor integrated circuit package.

In this example embodiment, terminal VM is coupled to power circuitry 102 in integrated circuit 100. Power circuitry 102 can include various functional circuits, such as a charge pump, power control logic, and the like as useful for the operation of integrated circuit 100 according to its intended purpose. In this example embodiment, power circuitry 102 includes voltage regulator circuit 104, which generates regulated voltages used internally to integrated circuit 100, including power supply voltage VCC in this example, from the voltage applied at terminal VM. Power supply voltage VCC is provided in integrated circuit 100 to power or bias one or more subsystems within the device. As shown in the example of FIG. 1, power supply voltage VCC biases the subsystem of digital logic circuitry 110 (in addition to other circuitry including, e.g., analog circuitry) of integrated circuit 100.

Input terminals IN1, IN2 are provided to receive input and control signals from a device (such as a computer, microcontroller, processor, digital logic, memory and/or analog circuitry) external to integrated circuit 100. Input terminals IN1, IN2 are coupled to input and mode control circuitry 106, which may be constructed as logic circuitry for interpreting digital signals received at terminals IN1, IN2 and forwarding corresponding signals to digital logic circuitry 110 in response. For example, input and mode control circuitry 106 may interpret certain combinations of signals received at terminals IN1, IN2 to select a particular mode of operation for integrated circuit 100 in driving motor M from output terminals OUT1, OUT2. Examples of modes that may be selectable from terminals IN1, IN2 include pulse-width-modulation (PWM), phase/enable, independent half-bridge, and parallel-half bridge interface modes. Input and mode control circuitry 106 also receives and forwards to digital logic circuitry 106 input signals received at terminals IN1, IN2 from which drive signals are to be generated at terminals OUT1, OUT2 according to the selected mode. For example, in the PWM interface mode, signals received at terminals IN1, IN2 from external circuitry (e.g., a microcontroller or the like) define the on and off edges in each cycle of the PWM drive applied to motor M.

In this example embodiment of FIG. 1, digital logic circuitry 110 is biased from the VCC power supply voltage generated by voltage regulator 104 from motor voltage VM, and also receives signals from input and mode control circuitry 106 responsive to input signals at terminals IN1, IN2. Digital logic circuitry 110 is constructed to generate drive signals DRV_1, DRV_2 in response to the input signals received at terminals IN1, IN2 and according to the selected operating mode (e.g., PWM). Drive signals DRV_1, DRV_2 are applied to gate driver circuits 112A, 112B, respectively. Gate driver circuits 112A, 112B are coupled to respective push-pull power transistor pairs (shown in FIG. 1 as two pair of transistors, each with a body diode) in output driver circuit 114, which in turn drive the motor drive output signals at output terminals OUT1, OUT2. As shown in FIG. 1 in this example embodiment, gate driver circuits 112A, 112B and output driver circuit 114 are biased from motor voltage VM. In some embodiments, voltage VM has a sufficient magnitude to drive motor M, but, in other embodiments, voltage VM may not have a sufficient magnitude to drive motor M and a charge pump (or other similar circuitry) may be utilized with voltage VM so as to effectively drive motor M.

Integrated circuit 100 according to this example embodiment includes autosleep logic 120, which provides an autosleep capability as will be described below. Autosleep logic 120 has inputs coupled to input terminals IN1, IN2, and generates an output signal EN that is applied to voltage regulator 104. As shown in FIG. 1, input terminals IN1, IN2 are also coupled to voltage regulator 104 in this example embodiment.

Figure 2:
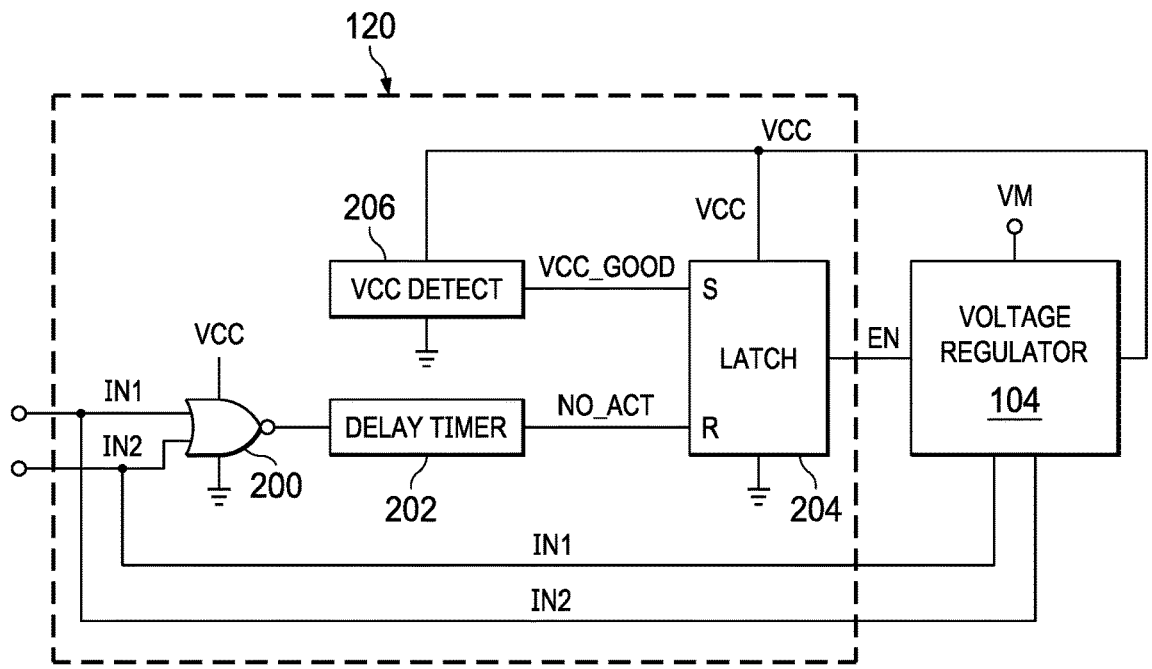
FIG. 2 is an electrical diagram, in block form, of autosleep logic circuitry in the integrated circuit of FIG. 1 according to an example embodiment.

FIG. 2 illustrates the construction of autosleep logic 120 according to this example embodiment. Autosleep logic 120 includes NOR function 200, which has two inputs coupled to inputs IN1, IN2, and an output coupled to an input of delay timer 202. NOR function 200 is biased from the VCC power supply voltage generated by voltage regulator 104. Delay timer 202 has an output at which it presents a signal NO_ACT in response to the output of NOR function 200. In this example embodiment, delay timer 202 is constructed from analog and/or digital logic including a timer to present an active level at its output as signal NO_ACT in response to the output of NOR function 200 remaining at a certain level for a preselected delay time T_OFF. In this example embodiment, delay timer 202 presents (e.g., enables or asserts) signal NO_ACT in response to the output of NOR function 200 remaining at a high logic level (e.g., a logic "1" level), indicating that both input terminals IN1, IN2 have remained at a low logic level for the duration of delay time T_OFF. For example, delay time T_OFF may be on the order of 2 msec. The output of delay timer 202 is coupled to a reset (R) input of latch 204.

In this embodiment, latch 204 is a set-reset (S-R) type latch and, in this example of autosleep logic 120, has its set (S) input coupled to the output of VCC detection circuit 206. VCC detection circuit 206 receives the VCC power supply voltage generated by voltage regulator 104, and is constructed of the appropriate analog and/or logic circuitry to issue (e.g., enable or assert) a signal VCC_GOOD at its output in response to the VCC power supply voltage being at or above threshold level V_TH. For example, the threshold level V_TH applied by VCC detection circuit 206 may be selected as a voltage sufficient for adequate bias of digital logic circuitry 110 and other functional circuitry in integrated circuit 100. Latch 204 is itself biased from the VCC power supply voltage generated by voltage regulator 104. The output of latch 204, which presents enable signal EN, is coupled to an input of voltage regulator 104. Latch 204 generates an active level (e.g., a logic high level) at its output as enable signal EN when in its set state, and an inactive level (e.g., a logic low level) generates as enable signal EN when in its reset state.

Figure 3:
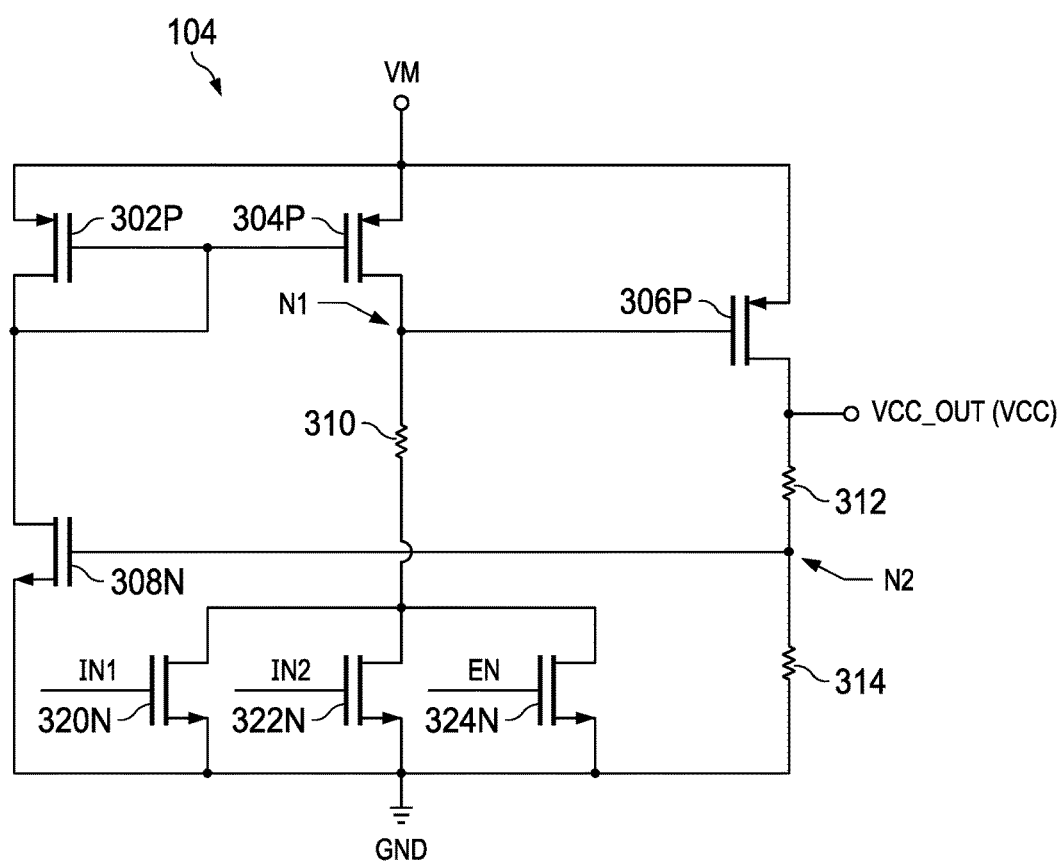
FIG. 3 is an electrical diagram, in schematic form, of voltage regulator circuit in the integrated circuit of FIG. 1 according to an example embodiment.

As will be described below, autosleep logic 120 operates in combination with voltage regulator 104 to cause integrated circuit 100 to enter and return from a sleep state. Referring now to FIG. 3, the construction of voltage regulator 104 according to an example embodiment will now be described.

Voltage regulator 104 is constructed to generate the VCC power supply voltage from the external motor voltage received at terminal VM. In this example, voltage regulator 104 includes three conductive legs coupled between motor voltage VM and circuit ground (e.g., as received at terminal GND). In one leg, p-channel MOS transistor 302P has its source coupled to motor voltage VM and its drain coupled to the drain of n-channel MOS transistor 308N, which in turn has its source coupled to ground. The gate and drain of transistor 302P are connected together in diode fashion.

In a second leg, p-channel MOS transistor 304P has its source coupled to motor voltage VM and its drain coupled at node N1 and to one terminal of resistor 310. The gate of transistor 304P is coupled to the gate and drain of transistor 302P, in current mirror fashion. A second terminal of resistor 310 is coupled to the drain of each of n-channel transistors 320N, 322N, 324N, the source of each of which is coupled to ground. The gate of transistor 320N is coupled to receive the input signal at terminal IN1, the gate of transistor 322N is coupled to receive the input signal at terminal IN2, and the gate of transistor 324N is coupled to receive enable signal EN at the output of autosleep logic 120. The source-drain paths of transistors 320N, 322N, 324N are thus in parallel with each other between node N1 and ground in this example.

In a third leg, p-channel MOS transistor 306P has its source coupled to motor voltage VM and its drain coupled to one terminal of resistor 312 at output node VCC_OUT. A second terminal of resistor 312 is coupled to one side of resistor 314, which has its other terminal coupled to ground. The gate of transistor 306P is coupled to node N1 at the drain of transistor 304P, and the gate of transistor 308N in the first leg of voltage regulator 104 is coupled to node N2 between resistors 312, 314. Output node VCC_OUT of voltage regulator 104 is at the drain of transistor 306P, and presents the VCC power supply voltage as generated by voltage regulator 104.

Other transistor types, such as MOS transistors of either p-channel or n-channel type, other types of field-effect transistors, bipolar or BiCMOS technology transistors, and the like may be used instead of or in combination with the illustrated MOS transistors in realizing the circuitry described in this specification, along with such modifications to the circuit as appropriate to incorporate devices of such alternative technology so as to carry out the functions of those circuits as described herein.

Figure 4:
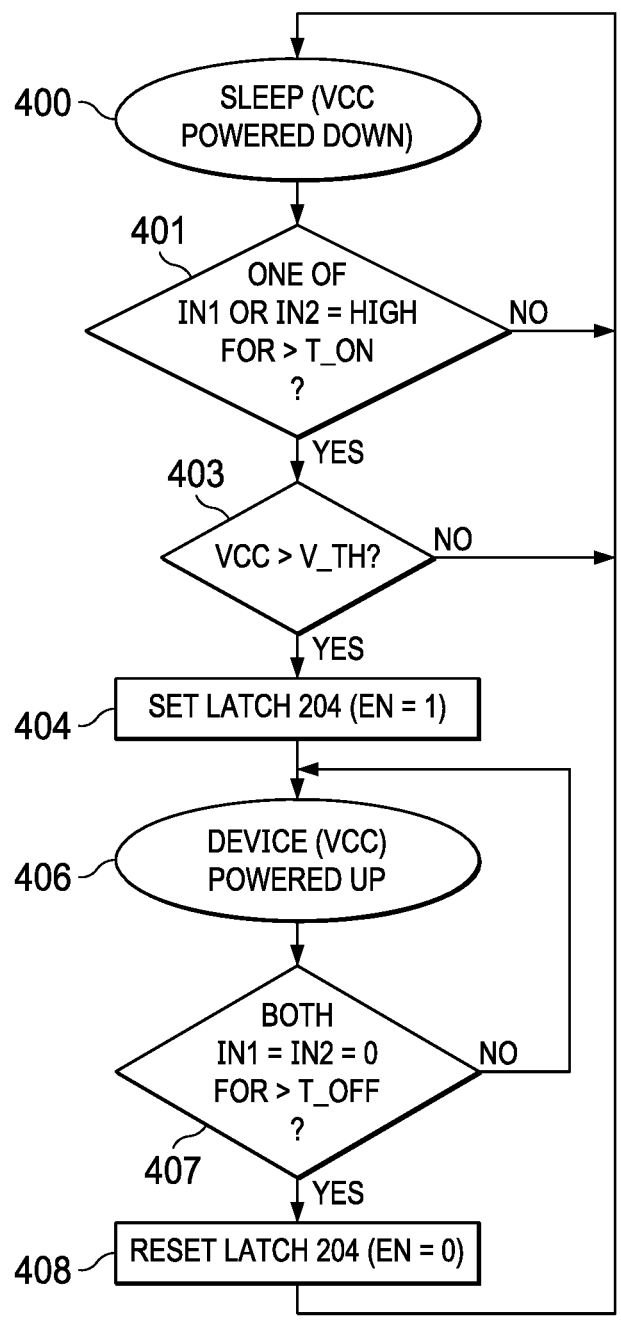
FIG. 4 is a flow and state diagram illustrating a method of operating the integrated circuit of FIG. 1 to enter and return from an autosleep state according to an example embodiment.

The operation of autosleep logic 120 in combination with voltage regulator 104 in integrated circuit 100, according to an example embodiment, will now be described with reference to the flow and state diagram of FIG. 4, in combination with FIG. 2 and FIG. 3. This description will begin with integrated circuit 100 having entered sleep state 400 following normal operation. In sleep state 400, digital logic circuitry 110 and other circuitry that is biased from the VCC power supply voltage are powered down and disabled. In addition to digital logic circuitry 110 being powered down in this state 400, autosleep logic 120 is also powered down, as evident from FIG. 2. In some example embodiments, NOR function 200, latch 204, and VCC detection circuit 206 are also powered down during sleep state 400 as evident from FIG. 2 (each being biased from the VCC power supply voltage).

As shown in FIG. 3, voltage regulator 104 remains biased from motor voltage VM, and remains off during the sleep mode of state 400. In this state, no input signals will have been received at input terminals IN1, IN2, holding all of transistors 320N, 322N, 324N in an off state. With transistor 306P off due to node N1 being held to motor voltage VM by transistor 304P, output node VCC_OUT is pulled to ground by resistors 312, 314, thereby disabling the VCC power supply voltage and powering down digital logic circuitry 110 and other circuitry in integrated circuit 100.

According to this example embodiment, integrated circuit 100 remains in sleep state 400 until activity is detected at either or both of input terminals IN1, IN2. In the flow diagram of FIG. 4, decision 401 determines whether either or both of input terminals IN1, IN2 has received an active signal (e.g., a logic high level) for at least a time T_ON. If not (decision 401 is NO), integrated circuit 100 remains in its sleep state 400. In this example embodiment, decision 401 is performed at voltage regulator 104 (FIG. 3), in which a logic high level at one or both of input terminals IN1, IN2 will turn on one of transistors 320N, 322N, pulling node N1 at the drain of transistor 304P and the gate of transistor 306P toward ground through resistor 310 and transistor 320N or 322N, as the case may be. If transistor 320N or 322N remains on long enough that node N1 reaches more than a transistor threshold voltage below motor voltage VM, transistor 306P will turn on, and current will conduct through resistors 312, 314. The current through resistor 314 raises the voltage at node N2 above ground by at least a transistor threshold voltage, thereby turning on transistor 308N and resulting in conduction through current mirror transistors 302P, 304P. The duration T_ON over which one of input terminals IN1, IN2 is to receive an active signal, in order for voltage regulator 104 to turn on, depends on the component values in voltage regulator 104 itself. In one example, time T_ON is on the order of 20 μsec. In some example embodiments, the value for T_ON may be changed at manufacturing of integrated circuit 100 or during operation based on additional circuitry (not shown), and/or user input or input from a microcontroller, processor, or other digital logic.

As voltage regulator 104 is turned on by the activity at one or both of input terminals IN1, IN2 for at least a time period of T_ON (decision 401 is YES), the current conducted by transistor 306P through resistors 312, 314 will begin to raise the voltage at output node VCC_OUT toward its eventual steady state voltage (e.g., the VCC power supply voltage). It is contemplated that, in many instances, the active signals at input terminals IN1, IN2 may toggle after initially becoming active, in which case it may require several cycles for voltage regulator 104 to develop a steady state voltage at its output node VCC_OUT. In this example embodiment, decision 403 is performed at VCC detection circuit 206 in autosleep logic 120 to determine whether the VCC power supply voltage generated by voltage regulator 104 has yet reached a voltage V_TH sufficient to power digital logic circuitry 110 and such other circuitry biased by the VCC power supply voltage in integrated circuit 100. Integrated circuit 100 remains in its sleep state 400 if voltage at output node VCC_OUT has not yet reached this voltage V_TH (decision 403 is NO). Upon voltage regulator 104 developing a voltage at its output node VCC_OUT at or above voltage V_TH, sufficient to power the appropriate circuitry in integrated circuit (decision 403 is YES), VCC detection circuit 206 in autosleep logic 120 issues signal VCC_GOOD (e.g., a low-to-high logic transition) at its output.

According to this example embodiment, signal VCC_GOOD from VCC detection circuit 206 is received at the set input of latch 204 in autosleep logic 120. In response, latch 204 issues an active (e.g., a high logic level) signal at its output as enable signal EN to voltage regulator 104 in process 404. This enable signal EN turns on transistor 324N in voltage regulator 104, which operates to maintain voltage regulator 104 to produce the VCC power supply voltage so long as latch 204 retains its set state. Digital logic circuitry 110 and other circuitry biased from the VCC power supply voltage are thus powered up, and integrated circuit 100 is in its powered-up state 406, operable to drive motor M in response to drive signals at input terminals IN1, IN2.

In operation in powered-up state 406 with at least one of transistors 320N, 322N, 324N turned on, voltage regulator 104 develops a steady state VCC power supply voltage at its output node VCC_OUT. First-order circuit analysis of voltage regulator 104 shows the voltage VCC at output node VCC_OUT as:

$$VCC = V_{gs1}\left(1 + \frac{R_{312}}{R_{314}}\right)$$

where $V_{gs1}$ is the gate to source voltage of transistor 308N, and where $R_{312}$ and $R_{314}$ are the resistances of resistors 312 and 314, respectively.

As evident from the foregoing, integrated circuit 100 is described herein as entering into its powered-up state 406 in response to activity at either or both two input terminals IN1, IN2. Alternatively, this determination of activity (or inactivity) for purposes of powering-up or powering-down integrated circuit 100 may instead be made relative to a single input terminal or relative to more than two input terminals.

While integrated circuit 100 is in powered-up state 406, autosleep logic 120 monitors input terminals IN1, IN2 for activity by way of its NOR function 200 and delay timer 202. At times at which both input terminals IN1 and IN2 are inactive (e.g., at a logic low level), NOR function 200 presents an active level (e.g., logic high level) at its output to delay timer 202. In decision 407, delay timer 202 determines whether this active level at the output of NOR function 200 has been maintained for delay time T_OFF (e.g., at least 2 msec). If not (decision 407 is NO), such as during operation in which input terminals IN1, IN2 may momentarily or periodically each be inactive for a brief period, integrated circuit 100 remains in its powered-up state 406 because latch 204 remains set. Upon inactivity at input terminals IN1, IN2 for a period of at least delay time T_OFF (decision 407 is NO), delay timer 202 issues signal NO_ACT at its output, for example as a low-to-high logic level transition. In response to the reset input of latch 204 receiving signal NO_ACT from delay timer 202, latch 204 enters its reset state and inactivates (e.g., drives to a low logic level) enable signal EN at its output in process 408.

With enable signal EN inactive because of the inactivity at both of input terminals IN1, IN2, all of transistors 320N, 322N, and 324N in voltage regulator 104 are turned off. This condition in turn turns off transistor 306P, pulling output node VCC_OUT to ground and powering-down voltage regulator 104 itself, as well as digital logic circuitry 110 and other circuitry powered from the VCC power supply voltage. Integrated circuit 100 enters powered-down or sleep state 400.

The example embodiments described above enable important advantages in integrated circuits, particularly in those for which a dedicated power supply pin for certain subsystems (e.g., digital logic) or a separate sleep mode pin is not available. An extremely low level of standby current conducted by an internal voltage regulator can be attained in a sleep mode, as the voltage regulator itself can be turned off by the condition triggering the autosleep logic. The autosleep and voltage regulator circuitry can be efficiently implemented in modern integrated circuits with little die area, especially as compared with the die area that would be necessary for voltage regulator resistors to attain the same level of sleep mode current consumption. In addition, the described embodiments can be realized in integrated circuits with low pin count.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device, or other electronics or semiconductor component.

Unless otherwise stated, "about," "approximately," or "substantially" preceding a value means+/−10 percent of the stated value. Modifications are possible in the described examples, and other examples are possible within the scope of the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Devices described to be implemented as an "integrated circuit" may be implemented on a single semiconductor die or on multiple semiconductor die (and either packaged in one semiconductor device package or in multiple semiconductor device packages). Conversely, devices and/or circuits identified as being "external" to the integrated circuit may be implemented within the "integrated circuit" in other example embodiments.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

While one or more embodiments have been described in this specification, it is of course contemplated that modifications of, and alternatives to, these embodiments, such modifications and alternatives capable of obtaining one or more of the technical effects of these embodiments, will be apparent to those of ordinary skill in the art having reference to this specification and its drawings. It is contemplated that such modifications and alternatives are within the scope of the claims presented herein.

What is claimed is:

1. An integrated circuit, comprising:
   at least one input terminal;
   a power supply terminal;
   autosleep logic circuitry comprising:
      a latch, having a set input and a reset input, and having an output;
      a voltage detection circuit, having an input and having an output coupled to the latch, the voltage detection circuit configured to present a signal at its output responsive to a voltage at its input exceeding a threshold level; and
      a delay timer, having an input coupled to each of the at least one input terminals and having an output coupled to the reset input of the latch, the delay timer configured to present a signal at its output responsive to detecting inactivity at the at least one input terminal for a delay time; and
   a voltage regulator circuit, comprising:
      a plurality of parallel transistors, each having a conductive path coupled in parallel with the conductive path of the others of the parallel transistors between a power supply node coupled to the power supply terminal and a ground node, a first one of the parallel transistors having a control terminal coupled to the output of the latch, and each of the other parallel transistors having a control terminal coupled to a corresponding one of the at least one input terminals; and
      an output leg coupled between the power supply node and the ground node, and configured to present a voltage at an output node responsive to at least one of the parallel transistors conducting current between the power supply node and the ground node, the output node coupled to the input of the voltage detection circuit;
   wherein the latch presents a signal at its output to turn on the first parallel transistor when in its set state.

2. The integrated circuit of claim 1, further comprising:
   a subsystem having a power supply node coupled to the output node of the output leg of the voltage regulator circuit.

3. The integrated circuit of claim 2, wherein the latch is biased from the output node of the output leg of the voltage regulator circuit.

4. The integrated circuit of claim 2, further comprising:
   circuitry biased from the power supply terminal.

5. The integrated circuit of claim 4, wherein the subsystem comprises digital logic biased from the output node of the output leg of the voltage regulator circuit, and the circuitry biased from the power supply terminal comprises output driver circuitry.

6. The integrated circuit of claim 5, further comprising:
   at least one output terminal for coupling to an electric motor;
   wherein the output driver circuitry is configured to drive current at the at least one output terminal responsive to signals received at the at least one input terminal.

7. The integrated circuit of claim 1, wherein the integrated circuit has a first and a second input terminal;
   and wherein the autosleep logic circuitry further comprises:
      a logic function having inputs coupled to the first and second input terminals, and an output coupled to the input of the delay timer, the logic function configured to present a signal at its output responsive to neither of the first and second input terminals receiving an active signal.

8. The integrated circuit of claim 1, wherein the voltage regulator circuit further comprises:
   a first current mirror transistor having a conductive path coupled between the power supply node and the conductive paths of the plurality of transistors, and having a control terminal;
   a second current mirror transistor having a conductive path and a control terminal coupled in diode fashion; and
   a third transistor having a conductive path coupled in series with the conductive path of the second mirror transistor between the power supply node and the ground node and having a control terminal coupled to the output leg;
   wherein the control terminal of the first mirror transistor is coupled to the control terminal of the second mirror transistor.

9. The integrated circuit of claim 8, wherein the voltage regulator circuit further comprises:
   a first resistor coupled between the conductive path of the first current mirror transistor and the conductive paths of the plurality of transistors;
   and wherein the output leg further comprises:
      a fourth transistor having a conductive path coupled between the power supply node and the output node, and having a control terminal coupled to a node between the conductive path of the first current mirror transistor and the first resistor; and
      second and third resistors, coupled in series between the output node and the ground node, the control terminal of the third transistor coupled to a node between the second and third resistors.

10. A method of powering a subsystem in an integrated circuit, comprising:
   detecting whether an active signal is received at one or more input terminals of the integrated circuit;
   responsive to detecting receipt of an active signal at one of the one or more input terminals, turning on a voltage regulator circuit to develop a power supply voltage at an output node for powering a subsystem of the integrated circuit;
   responsive to the power supply voltage then exceeding a threshold level, setting a latch in an autosleep circuit in the integrated circuit to maintain the voltage regulator circuit in an on state;
   responsive to detecting that an active signal has not been received at the one or more input terminals for at least a delay time, resetting the latch in the autosleep circuit to turn off the voltage regulator circuit; and
   repeating the detecting step.

11. The method of claim 10, wherein the detecting step detects whether an active signal is received at one of a first and a second input terminal;
   and wherein the turning on step is performed responsive to detecting receipt of an active signal at either of the first and second input terminals.

12. The method of claim 10, further comprising:
   responsive to the power supply voltage exceeding the threshold level, powering on a subsystem in the integrated circuit.

13. The method of claim 12, wherein the threshold level corresponds to an operating bias level of the subsystem.

14. The method of claim 10, wherein the detecting step is performed by:
   turning on one or more transistors in the voltage regulator circuit, each of the one or more transistors having a control terminal coupled to a corresponding one of the one or more input terminals so that an active signal at the input terminal causes the corresponding transistor to turn on;
   and wherein the voltage regulator circuit is turned on by either of at least one of the one or more transistors in the voltage regulator circuit turned on or the latch being in its set state.

15. The method of claim 14, wherein the voltage regulator circuit is turned off by none of the at least one of the one or more transistors in the voltage regulator circuit being turned off and the latch being in its reset state.

16. An integrated circuit, comprising:
   an autosleep circuit comprising a latch, and logic circuitry configured to set the latch responsive to an internal power supply voltage exceeding a threshold level and to reset the latch responsive to one or more input terminals of the integrated circuit not receiving an active signal for a delay time;
   a voltage regulator circuit, configured to generate, at an output node, the internal power supply voltage from a power supply voltage responsive to one of the latch of the autosleep circuit being set or to one or more input terminals receiving an active signal; and
   a subsystem, having a power supply node coupled to the output node of the voltage regulator circuit.

17. The integrated circuit of claim 16, wherein the one or more input terminals comprise a first input terminal and a second input terminal;
   and wherein the logic circuitry of the autosleep circuit comprises:
   a logic function configured to output a signal responsive to neither of the first and second input terminals receiving an active signal; and
   a delay timer, having an input coupled to the logic function, configured to output a signal to a reset input of the latch responsive to neither of the first and second input terminals receiving an active signal over the duration of the delay time.

18. The integrated circuit of claim 17, wherein the logic circuitry of the autosleep circuit further comprises:
   a voltage detection circuit having an input coupled to the output node of the voltage regulator circuit, and configured to output a signal to a set input of the latch responsive to the internal power supply voltage at the output node of the voltage regulator circuit exceeding the threshold level.

19. The integrated circuit of claim 16, wherein the voltage regulator circuit is configured to be turned off responsive to the latch of the autosleep circuit being reset and to none of the one or more input terminals receiving an active signal.

* * * * *